Oct. 18, 1949.    T. M. FERRILL, JR    2,484,819
RADIO NAVIGATION SYSTEM
Filed Oct. 29, 1946    2 Sheets-Sheet 1
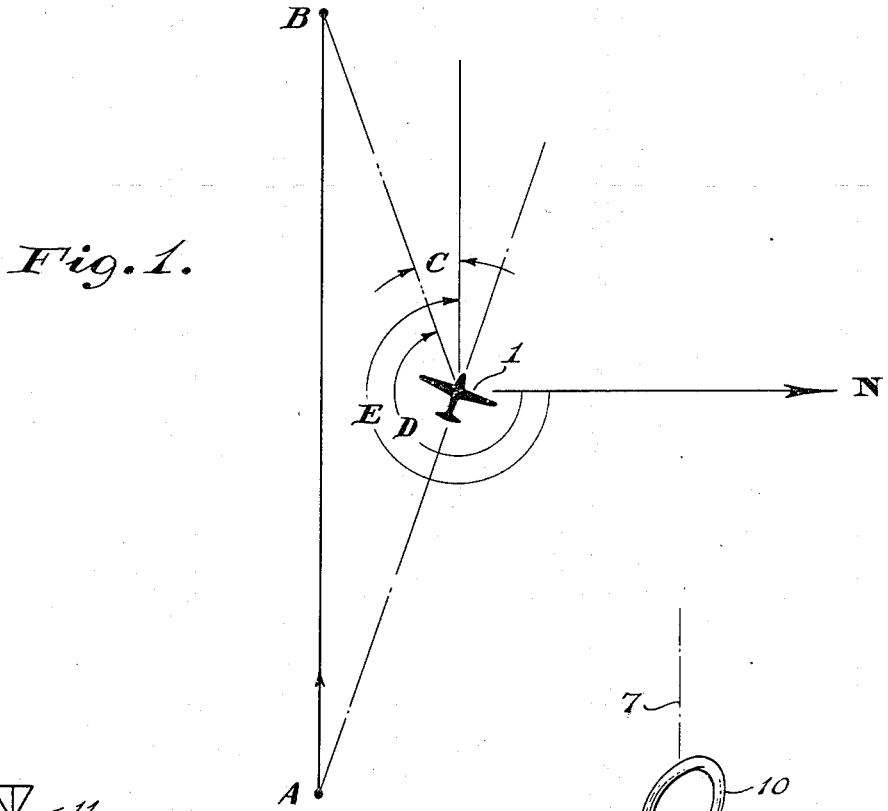
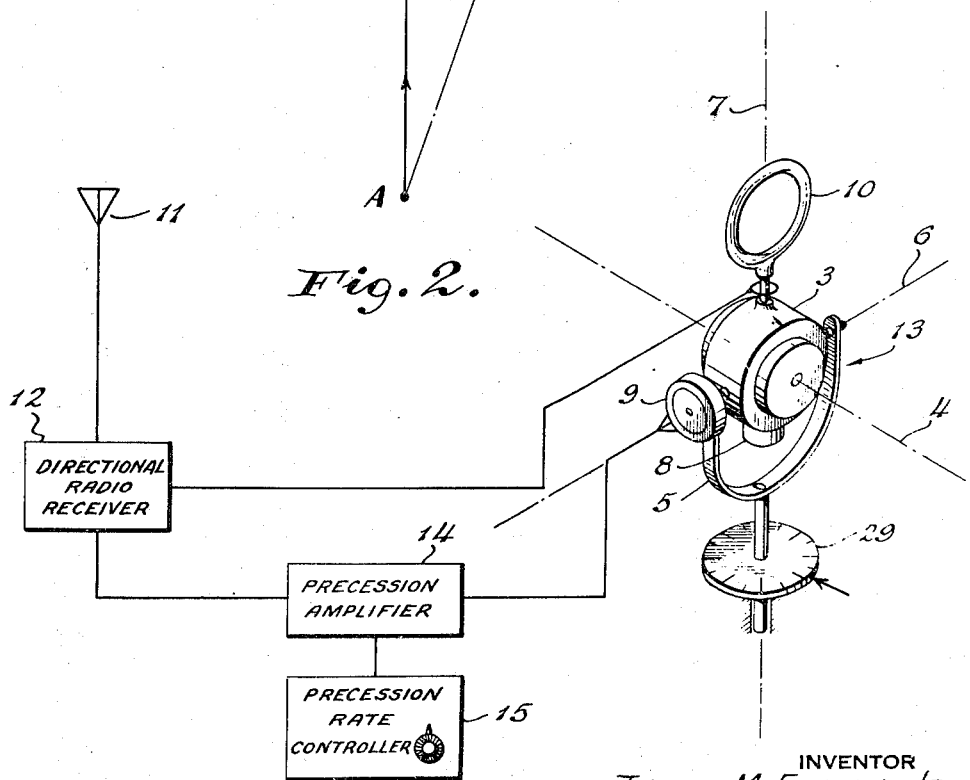
INVENTOR
THOMAS M. FERRILL, JR.
BY
his ATTORNEY Oct. 18, 1949.  T. M. FERRILL, JR  2,484,819
RADIO NAVIGATION SYSTEM
Filed Oct. 29, 1946  2 Sheets-Sheet 2

INVENTOR
THOMAS M. FERRILL, JR.
BY
his ATTORNEY.

Patented Oct. 18, 1949

2,484,819

UNITED STATES PATENT OFFICE 2,484,819

RADIO NAVIGATION SYSTEM

Thomas M. Ferrill, Jr., Hempstead, N. Y., assignor to The Sperry Corporation, a corporation of Delaware Application October 29, 1946, Serial No. 706,337

17 Claims. (Cl. 343—117)

This invention relates generally to radio navigation systems and more particularly to homing apparatus adapted to guide a craft relative to a radio transmitter along any desired path or ground track.

Radio navigation systems have been disclosed capable of providing a positional error signal, which may be employed to indicate the angular displacement of a craft from a desired path, or which may be supplied to an automatic pilot to steer the craft along the path. In some of these navigation systems, the positional error signal is derived by an appropriate combination of the information supplied by a stable directional reference device such as a gyroscope arranged to indicate the heading of the craft relative to, say, magnetic north, and that provided by an automatic radio direction finder adapted to indicate the relative transmitter bearing, i. e., the angle of a radio station situated on the desired path as measured relative to the longitudinal axis of the craft.

In such systems the guidance signal, which either actuates a right-left meter or serves to produce proportional change in the adjustable heading on which the automatic pilot maintains the craft, is sensitive to any errors in the operation of the automatic radio direction finder.

Conventional automatic radio direction finder receivers derive signals whose amplitude, phase, or polarity vary in accordance with the angular displacement and sense of displacement between the rotatable loop antenna and the received wave front. This error signal customarily energizes a loop drive motor which rotates the loop antenna as rapidly as possible to the null position.

Prior to the present invention, this error signal has been seriously modified by interference from other than the desired transmitter and by static, and also has responded to changes in the direction of the wave front caused by variations in local quadrantal error during banking, as well as other distortions resulting from variations in the surrounding terrain. The conventional direction finder loop tends to respond to these spurious but momentary changes in the apparent direction of the transmitter, and thus causes a fluctuating positional error indication which detracts from the operation of an automatic homing system.

According to the present invention it has been found advantageous to exercise a dual rotational control over the directive antenna. A relatively tight stabilization of the loop in absolute azimuth is provided, acting independently of the turning of the craft. The loop orientation is gradually modified according to the average or integrated direction finder error signal for slowly and smoothly altering the absolute azimuth of the antenna in space.

The tight control stabilizes the position of the directional antenna in space and is carried out by locking the antenna direction under the control of a suitable directional reference device such as a gyroscope. The direction in which the antenna is stabilized may then be slowly altered in response to the direction finder receiver proportionally to the steady average displacement of the antenna from its stabilized null position, such as caused by a constant lateral drift of the craft.

This averaging effect of the direction finder output may be accomplished by integrating means which are responsive to the steady average deviations but not to fast momentary changes in radio signal direction. Such integrating means may comprise a system having inertia such as a gyroscope, a sluggish motor-drive system, or a geared drive having a high step-down gear ratio.

The integrating means used in this invention is a gyroscope and the slow averaging control may be conveniently carried out by precessing the gyroscope, in response to the output of the directional radio receiver. Thus, the direction finder is relieved from the duty of responding to momentary alterations in the craft's heading.

The stable directional reference device is solely responsible for maintaining the directional antenna pointing at the transmitter. However, slow changes in the orientation of the antenna necessitated by movement of the craft are independently introduced in accordance with the average direction finder error signal whereby momentary spurious responses of the receiver are substantially cancelled out. The degree of smoothing may be chosen to conform with the time rate of change of the absolute bearing of the transmitter from the craft in order that the craft guidance signal may suffer from the least disturbance while representing without time delay the displacement of the craft from the desired ground track.

Accordingly, an object of this invention is to provide craft directional radio apparatus whose output is averaged or integrated, and whose action is smooth and not erratic.

Another object of this invention is to provide automatic directional radio apparatus whose output is integrated by gyroscopic means.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Another object of this invention is to provide automatic craft navigation apparatus including, in combination, directional reference means such as a gyro compass, integrated radio directional means, and utilization means.

Other objects and advantages will become apparent from the following specification taken in connection with the accompanying drawings, wherein:

Fig. 1 is a diagram illustrative of the principle of operation;

Fig. 2 is a schematic block diagram of an embodiment of the invention;

Figure 3:
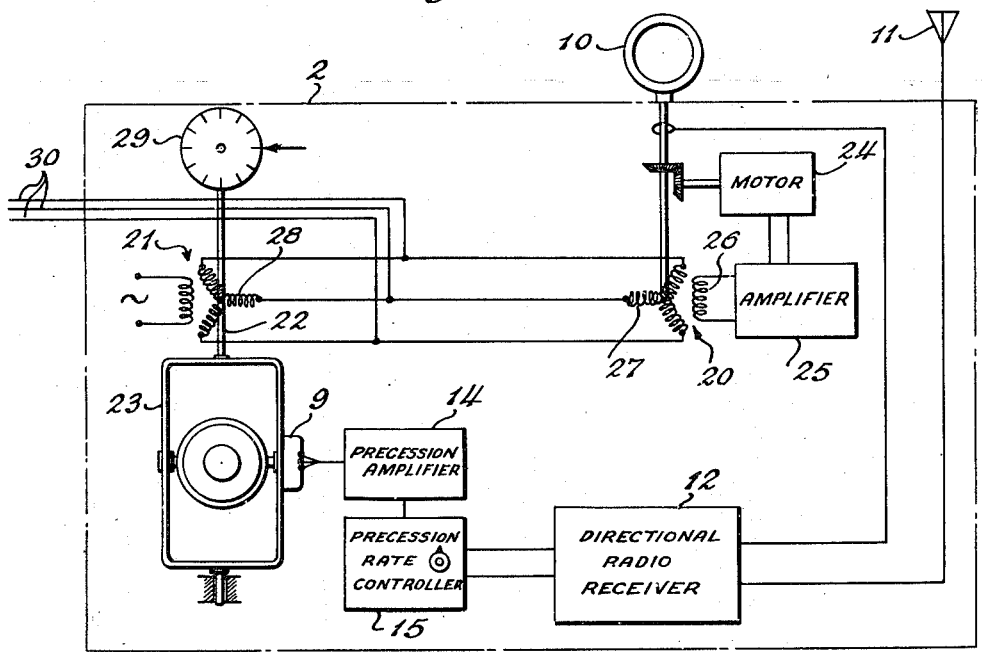
Fig. 3 is a schematic diagram of another embodiment of the invention.

Referring to Fig. 1, the original path of the craft 1 is from A to B and the craft has deviated or drifted from this path to the position shown, the transmitting source being located at point B. The absolute transmitter bearing is indicated by angle D and the absolute course bearing is indicated by angle E. The positional error angle C is the angular displacement of the craft from a predetermined course as measured relative to a fixed point on the course. The positional error angle C is equal to the absolute transmitter bearing D minus the course bearing E. This absolute transmitter bearing may be derived from the sum of the relative transmitter bearing and the craft heading as will be explained hereinafter.

Referring to Fig. 2, there is shown one embodiment of the invention comprising a conventional automatic radio direction finder utilizing a gyroscope as the integrating means. The direction finder comprises directional antenna 10, and non-directional antenna 11 both operably connected to a conventional directional radio receiver 12. The directional antenna is vertically mounted on a gyroscope 13 and its axis is therefore stabilized in a vertical plane and in azimuth by the action of the gyroscope 13 regardless of the attitude of the craft.

The gyroscope is of the type having a rotor mounted in a rotor case 3 for rotation about a horizontal axis 4. The rotor case is pivotally mounted in a yoke 5 and adapted to rotate about axis 6. The yoke 5 is pivotally mounted and adapted to rotate about normally vertical axis 7. The directional antenna 10 is mounted on and fixed to said rotor case 3, being counterbalanced by weight 8. Torque applying means 9 are provided to precess the gyroscope and the attached directional antenna 10 about normally vertical axis 7.

Therefore the directional antenna 10 is adapted to be rotated by the gyroscope 13, which may be smoothly turned by being precessed in response to signals from precession amplifier 14, which in turn is actuated by signals from directional radio receiver 12. The rate of precession is adapted to be controlled by the precession rate controller 15, thus providing controllable smoothness of operation.

Thus, when a signal is received, if the directional antenna 10 is not properly oriented on the bearing of the transmitting source, an error signal will be generated in the radio receiver 12 and applied to the precession amplifier 14. The precession amplifier 14 will then supply a signal to a torque applying means not shown, within the gyroscope, which will precess the gyroscope 13 to thereby turn the directional antenna 10 into a position of null reception, i. e., into the bearing of the transmitting source relative to the craft which may be read on indicator 29. The torque applying means 9 may be a combination of inductive coils suitably mounted, or other means well-known to the art. Due to the inertia inherent in the gyroscope, this system is not sensitive to erratic spasmodic radio signals from random directions such as static or reflection effects. The gyro and directional antenna may be initially set near the proper bearing by manually precessing the gyro.

Referring to Fig. 3, there is shown another embodiment of the invention wherein the directional antenna is not physically mounted on the gyroscope but may be located some distance away, providing that the rotation axis of the directional antenna and one axis of the gyroscope are in parallel planes and interconnected by suitable telemetric means such as Selsyns or synchros. This arrangement, in general, is much more flexible, and has the advantage that the gyroscope may be more conveniently mounted near the center of gravity of the craft.

In this embodiment, the shaft of the directional antenna 10 is connected to the shaft of the synchro-control transformer 20. The rotor windings 27 of the synchro-control transformer 20 are connected to the rotor windings 28 of the synchro-generator 21, whose shaft 22 is connected to a directional gyroscope 23 and to radio relative bearing indicator 29. The directional antenna 10 shaft is also adapted to be rotated by a motor 24 in response to signals from amplifier 25, the input of which is connected to the stator windings of synchro-control transformer 20.

If the directions of the directional antenna 10 and the axis of gyrscope 23 do not coincide there will be an error signal generated in winding 26 of synchro 20. This error signal is applied to amplifier 25 and actuates motor 24 to thereby turn the directional antenna 10 into a position which coincides with that of the gyroscope. Thus the gyroscope axis and the direction finder loop directivity axis are tightly coupled in direction and will not deviate appreciably even if the craft turns sharply.

The radio frequency outputs from directional antenna 10 and non-directional antenna 11 are connected to radio receiver 12 which combines them as in the previous embodiment of Fig. 2 and provides a signal through the precession amplifier 14 to torque applying means which tends to slowly precess gyroscope 23 in the direction desired. Thus the loop is stabilized in absolute bearing and during a radio signal fade-out or lapse, the loop will be kept oriented in the direction of the radio station regardless of the turning of the craft. Therefore, when the signal returns the loop will be in a position to receive it.

Figure 4:
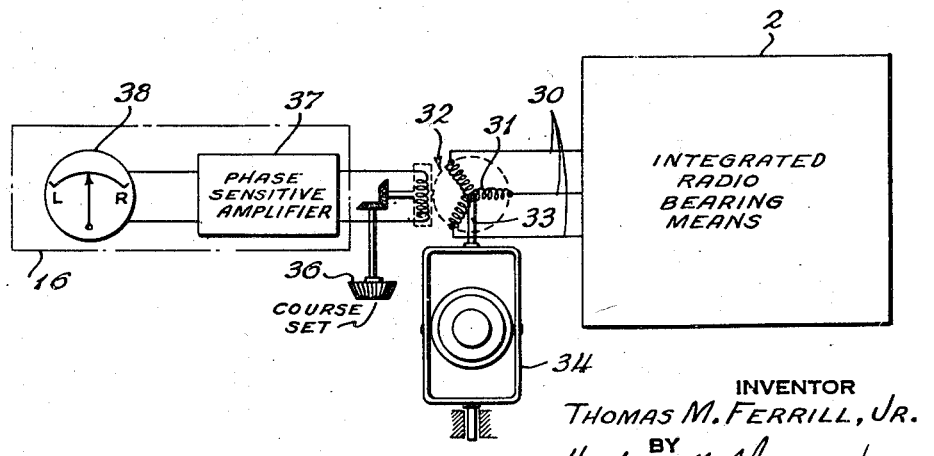
Fig. 4 is a schematic diagram of the invention utilized to actuate a positional error indicator.

Referring to Fig. 4, there is shown an embodiment of the invention connected to a utilization device 16, in this case a left-right positional error indicator 38. The integrated radio bearing means shown in the dotted block 2 are identical with the embodiment of Fig. 3, and produce voltages representative of the relative transmitter bearing in output leads 30. Leads 30 are connected to winding 31 of synchro control transformer 32, which winding is adapted to be rotated by shaft 33, the output shaft of directional gyro compass 34.

The output of the integrated radio bearing means 2 is the relative transmitter bearing with respect to the craft heading. It is desired to obtain absolute transmitter bearing which is defined as follows:

Absolute transmitter bearing=
craft heading+relative transmitter bearing

The craft heading is provided by directional gyro 34 through shaft 33 and it is combined with the relative transmitter bearing to produce absolute transmitter bearing information in winding 31.

The desired input of the indicator is the positional error which is defined as follows:

Positional error=absolute
transmitter bearing—course angle

The course angle is added to the absolute transmitter bearing by setting the knob 36. Therefore, the output of synchro control transformer 32 of the phase-sensitive amplifier 37 is a function of the positional error angle. The phase-sensitive amplifier 37 provides signals to the left-right indicator proportionally to the positional error signal.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Craft navigation apparatus comprising directional reference means, directional radio means, means to stabilize the orientation of said directional radio means relative to a transmitting source, integrating means to adjust the stabilized position of said directional radio means, and utilization means responsive to the resultant output of said directional reference means and said directional radio means to indicate the bearing of said transmitting source.

2. Craft navigation apparatus comprising directional reference means, directional radio means, gyroscopic means adapted to stabilize said directional radio means relative to a transmitting source, means to precess said gyroscopic means proportionally to the average error signal of said directional radio means, and craft position indicating means responsive to the resultant output of said directional reference means and said stabilized directional radio means.

3. Directional radio apparatus comprising a rotatable directional antenna, a radio receiver coupled to said antenna and adapted to produce null output signal when said antenna is aligned with the direction of arrival of a selected wave front and to produce an error signal indicative of angular divergence of said antenna from the direction of arrival of the selected radio wave front, means for maintaining said antenna stabilized in an adjustable direction, and means responsive to said error signal over an appreciable time for adjusting said direction according to the integrated values thereof.

4. Directional radio apparatus comprising a rotatable vertically stabilized, directional antenna, a radio receiver coupled to said antenna and adapted to produce an error signal indicative of orientation of said antenna relative to the direction of a radio source, means for maintaining said antenna orientated in an adjustable direction, and means responsive to said error signal for adjusting said direction according to the time integral thereof.

5. Radio direction-finder apparatus comprising a rotatable loop antenna, a radio direction-finder receiver coupled to said antenna and adapted to produce an error signal indicative of the amount and sense of angular displacement thereof from the direction of arrival of an impinging radio wave front, means for maintaining said loop antenna stabilized in bearing, and integrating means for changing said stabilized bearing in accordance with the average amplitude of the error signal.

6. Directional radio apparatus comprising a rotatable loop directional receiving antenna, a radio receiver coupled to said antenna and adapted to produce an error signal indicative of orientation of said antenna relative to a fixed radio source, gyroscopic means for maintaining said antenna oriented in an adjustable direction relative to said fixed radio source, and means responsive to said error signal for precessing said gyroscopic means to thereby adjust said direction.

7. In a radio craft navigation system, a directional antenna, a receiver connected thereto adapted to generate signals proportiotnal to the angular divergence of said directional antenna from a position of null response and a gyroscope adapted to rotate said directional antenna into a position of null reception in response to said receiver.

8. In a radio craft navigation system a directional antenna rotatable about a vertical axis, stable reference means for resisting the tendency of said antenna to turn along with the craft during changes of craft heading, a radio receiver electrically connected to said directional antenna, and means responsive to the output of said receiver for rotating said directional antenna into a position of null reception, said means for rotating said antenna being limited to a very slow angular rate.

9. Craft directional radio receiving means comprising a directional antenna adapted to be rotated about a normally vertical axis, a radio receiver connected thereto, a gyroscope having its axis parallel to the axis of the directional antenna and adapted to control the rotation of said antenna about said normally vertical axis, and means to precess said gyroscope in response to signals from said receiver to thereby rotate said directional antenna to a position of null reception.

10. In an automatic direction finder system, a directional antenna adapted to be rotated about a vertical axis, a radio receiver operated therefrom, a gyroscope, and means coupled to said gyroscope to rotate said directional antenna to a position of null response from said receiver, said means including means for holding the orientation of said antenna fixed in space in the absence of output signals from said receiver.

11. In an automatic direction finder system, a directional antenna adapted to be rotated, a radio receiver operated therefrom, and means to rotate said antenna to a position of null reception, said means including a gyroscope coupled to said antenna, and means responsive to said receiver for rotating said directional antenna to the position of null reception.

12. Craft radio receiving apparatus for determining the direction of a distant radio transmitting station, comprising a directional radio receiving antenna supported for rotation about a vertical axis, means having long-time stability about said vertical axis for stabilizing the orientation of said antenna in space, a radio receiver coupled to said antenna for producing an output signal when the direction of said antenna is divergent from the direction of arrival of the radio energy, and means coupled to said receiver and responsive to said output signal for producing relatively gradual variations of the space orientation of said antenna in the direction to suppress said output signal.

13. Radio energy directional apparatus comprising a directional radio receiving antenna supported for rotation about a vertical axis, means having long-time stability about said vertical axis for stabilizing the orientation of said antenna in space, a radio receiver coupled to said antenna for producing an output signal varying according to the direction of said antenna relative to the direction of arriving radio energy, and means coupled to said receiver and responsive to said output signal for producing relatively gradual variations of the space orientation of said antenna, said long-time stability means comprising a gyroscope having a rotor, a rotor frame supporting said rotor for rotation about a horizontal spin axis, and a suspension system including a vertical-axis pivotally supported yoke supporting said rotor frame pivotally about a normally horizontal axis transverse said spin axis, said directive antenna having its axis aligned in fixed relationship to said spin axis.

14. Directional radio apparatus comprising a rotatable loop directional receiving antenna journalled for rotation about a vertical axis, a radio receiver coupled to said antenna and adapted to produce an error signal indicative of orientation of said antenna in azimuth relative to the direction of arrival of radio waves from a distant radio transmitting station, a stable azimuth reference device, means responsive to said device for stabilizing the direction of said loop antenna in azimuth, and means responsive to said error signal for gradually altering the azimuthal direction of said loop antenna, whereby the direction of said loop antenna represents an integration of the error signals over an appreciable time.

15. Directional radio apparatus as defined in claim 14, wherein said means for gradually altering the azimuthal direction of said loop antenna comprises means for gradually turning said stable reference device about the vertical axis.

16. Directional radio apparatus as defined in claim 15, wherein said loop antenna is stabilized about the horizontal axis perpendicular to the loop axis by said stable reference device.

17. Craft directional radio apparatus for indicating the direction of a remote radio transmitting station, comprising a rotatable directional receiving antenna journalled for rotation about a normally vertical axis of the craft, a radio receiver having an input circuit coupled to said antenna and having an output circuit producing an error signal indicative of rotation of said antenna in azimuth relative to the transmitting station, means for providing a stable azimuthal reference, means coupled to said stable reference means for slaving said rotatable antenna relative thereto whereby the orientation of said antenna is rendered independent of the heading of said craft, and means responsive to said error signal for gradually varying the orientation of said antenna whereby the orientation of said antenna is made to represent the average apparent direction of incoming waves from the distant transmitting station.

THOMAS M. FERRILL, Jr.

REFERENCES CITED

The following references are of record in the file of this patent:

UNITED STATES PATENTS

| Number | Name | Date |
| --- | --- | --- |
| 2,043,336 | Sjostrand | June 9, 1936 |
| 2,299,083 | Elm | Oct. 20, 1942 |
| 2,382,993 | Haskins | Aug. 21, 1945 |
| 2,390,383 | Neufeld | Dec. 4, 1945 |
| 2,415,679 | Edwards et al. | Feb. 11, 1947 |
| 2,419,970 | Roe et al. | May 6, 1947 |